(12) United States Patent
Suriano et al.

(10) Patent No.: US 12,209,028 B2
(45) Date of Patent: Jan. 28, 2025

(54) METHOD AND SYSTEM FOR RECOVERING METALS FROM BLACK MASS

(71) Applicant: AURUBIS AG, Hamburg (DE)

(72) Inventors: Anne-Marie Suriano, Hamburg (DE); Leslie James Bryson, Hamburg (DE); Marcus Eschen, Senden (DE)

(73) Assignee: AURUBIS AG, Hamburg (DE)

( * ) Notice: Subject to any disclaimer, the term of this patent is extended or adjusted under 35 U.S.C. 154(b) by 0 days.

(21) Appl. No.: 18/688,799

(22) PCT Filed: Sep. 5, 2022

(86) PCT No.: PCT/EP2022/074579
§ 371 (c)(1),
(2) Date: Mar. 4, 2024

(87) PCT Pub. No.: WO2023/036726
PCT Pub. Date: Mar. 16, 2023

(65) Prior Publication Data
US 2024/0270590 A1 Aug. 15, 2024

(30) Foreign Application Priority Data

Sep. 7, 2021 (DE) ...................... 10 2021 123 151.5

(51) Int. Cl.
*C01D 15/02* (2006.01)
*C01B 25/30* (2006.01)
(Continued)

(52) U.S. Cl.
CPC .............. *C01D 15/02* (2013.01); *C01B 25/30* (2013.01); *C01D 15/08* (2013.01); *C01G 45/02* (2013.01);
(Continued)

(58) Field of Classification Search
CPC ........ C01B 25/30; C01D 15/02; C01D 15/08; C01G 45/02; C01G 53/04; C01G 53/10;
(Continued)

(56) References Cited

U.S. PATENT DOCUMENTS 9,034,294 B1   5/2015 Harrison
2011/0044882 A1* 2/2011 Buckley ................. C01D 15/02
                                              423/481

(Continued)

FOREIGN PATENT DOCUMENTS

CN   107394298 A   * 11/2017 ............... C22B 7/00
CN   107978814 A   *  5/2018
(Continued)

OTHER PUBLICATIONS

Jiang et al. CN110835682A English Translation (Year: 2020).*
(Continued)

*Primary Examiner* — Alexandra M Moore
*Assistant Examiner* — Jordan W Taylor
(74) *Attorney, Agent, or Firm* — Leydig, Voit & Mayer, Ltd.

(57) ABSTRACT

A process recovers metals from a black mass. The process includes the following steps in the following order: step (a) providing the black mass, which comprises Li; step (b) adding water to the black mass and creating a suspension of the black mass in the water; step (c) dosing ozone as an oxidant to the suspension while stirring the suspension; and step (d) filtering and separating a filtrate containing LiOH dissolved in water from a Li depleted residue of the black mass. In step (c), the suspension is stirred with a shear rate greater than 11000 s$^{-1}$ within the suspension.

17 Claims, 2 Drawing Sheets

(51) Int. Cl.
*C01D 15/08* (2006.01)
*C01G 45/02* (2006.01)
*C01G 53/04* (2006.01)
*C01G 53/10* (2006.01)
*C22B 3/00* (2006.01)
*C22B 3/22* (2006.01)
*C22B 3/44* (2006.01)
*C22B 7/00* (2006.01)
*C22B 26/12* (2006.01)
*C22B 47/00* (2006.01)
*H01M 10/54* (2006.01)

(52) U.S. Cl.
CPC ............ *C01G 53/04* (2013.01); *C01G 53/10* (2013.01); *C22B 3/22* (2013.01); *C22B 3/44* (2013.01); *C22B 7/006* (2013.01); *C22B 23/0461* (2013.01); *C22B 26/12* (2013.01); *C22B 47/00* (2013.01); *H01M 10/54* (2013.01)

(58) Field of Classification Search
CPC ....... C22B 23/0461; C22B 26/12; C22B 3/22; C22B 3/44; C22B 47/00; C22B 7/006; H01M 10/54
See application file for complete search history.

(56) References Cited

U.S. PATENT DOCUMENTS

| | | |
|---|---|---|
| 2013/0247721 A1 | 9/2013 | Kudo et al. |
| 2013/0287654 A1 | 10/2013 | Yamada et al. |
| 2014/0227154 A1 | 8/2014 | Harrison |
| 2019/0207275 A1 | 7/2019 | Amouzegar et al. |
| 2020/0328482 A1 | 10/2020 | Ho et al. |
| 2021/0316998 A1 | 10/2021 | Ariyoshi et al. |

FOREIGN PATENT DOCUMENTS

| | | | | |
|---|---|---|---|---|
| CN | 109852807 A | * | 6/2019 | |
| CN | 110835682 A | * | 2/2020 | .............. C22B 1/005 |
| CN | 109592699 B | * | 8/2021 | .............. C01D 15/02 |
| DE | 102015221422 A1 | | 5/2017 | |
| EP | 3431618 A1 | | 1/2019 | |
| JP | 2012126945 A | | 7/2012 | |
| JP | 2020035723 A | | 3/2020 | |
| JP | 2021073375 A | | 5/2021 | |
| WO | WO 2019184029 A1 | | 10/2019 | |
| WO | WO-2020118436 A1 | * | 6/2020 | .............. C01D 15/02 |
| WO | WO 2020212587 A1 | | 10/2020 | |

OTHER PUBLICATIONS

Sun et al. CN109592699B English Translation (Year: 2021).*
Li et al. CN107394298A English Translation (Year: 2017).*
Sun et al. CN107978814A English Translation (Year: 2018).*
Sun et al. CN109852807A English Translation (Year: 2019).*
Wang et al.; Evaluation of Ozone as an Efficient and Sustainable Reagent for Chalcopyrite Leaching: Process Optimization and Oxidative Mechanism; Journal of Industrial and Engineering Chemistry, The Korean Society of Industrial and Engineering Chemistry, Aug. 28, 2021, pp. 333-344, vol. 104, Elsevier B.V., Korea, DOI: 10.1016/J.JIEC.2021.08.036.

* cited by examiner

METHOD AND SYSTEM FOR RECOVERING METALS FROM BLACK MASS

CROSS REFERENCE TO RELATED APPLICATIONS

This application is a U.S. National Phase application under 35 U.S.C. § 371 of International Application No. PCT/EP2022/074579, filed on Sep. 5, 2022, and claims benefit to German Patent Application No. DE 10 2021 123 151.5, filed on Sep. 7, 2021. The International Application was published in German on Mar. 16, 2023 as WO 2023/036726 A1 under PCT Article 21(2).

FIELD

The present disclosure relates to a process for recovery of metals from black mass containing lithium and a corresponding facility.

BACKGROUND

The worldwide estimated battery production will reach more than 4 TWh until 2030. The resources needed for said production, namely raw materials like lithium, graphite, nickel, cobalt and manganese, will accordingly reach an estimated volume of more than 10 million tons in the year 2030. The origin of the needed raw materials will mainly be primary sources from ores, nevertheless the share of secondary sources from recycling will increase in the future. Secondary sources may be end-of-lifetime lithium-ion batteries or materials and whole batteries which were sorted out in a production process.

Such secondary sources are pre-processed to a so-called black mass, which is a mixture of lithium-ion battery scrap and/or scrap materials from battery production processes that is processed to a fine powdered product. Thus, the black mass usually contains a mixture of active anode and/or cathode materials of lithium-ion batteries. Furthermore, the black mass may contain plastics and/or conductors like copper and/or aluminum.

Several processes are known to recover the main elements from said black mass. Besides pyrometallurgical process routes, several hydrometallurgical process routes are known.

For example, from the EP 3431618 A1 a process is known, in which lithium-ion battery scrap is leached with a subsequent Al removal step, followed by a Fe removal step. Thereafter, a Ni, Co recovery step is carried out, leaving Li to be extracted at the end of the process.

In the WO 2020/212587 A1 a process is disclosed in which lithium is extracted upstream in the recovery process for Ni and Co.

These processes have low extraction rates and/or provide a low selectivity in intermediate products.

SUMMARY

In an embodiment, the present disclosure provides a process that recovers metals from a black mass. The process includes the following steps in the following order: step (a) providing the black mass, which comprises Li; step (b) adding water to the black mass and creating a suspension of the black mass in the water; step (c) dosing ozone as an oxidant to the suspension while stirring the suspension; and step (d) filtering and separating a filtrate containing LiOH dissolved in water from a Li depleted residue of the black mass. In step (c), the suspension is stirred with a shear rate greater than 11000 s−1 within the suspension.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Aspects of the present disclosure provide a cost-efficient process for recovery of metals from black mass, which allows for a high selectivity of recovered metals.

An aspect of the present disclosure provides a process for recovery of metals from black mass with the following steps in the following order:
step (a) providing black mass containing Li;
step (b) adding water to the black mass and creating a suspension of black mass in water;
step (c) dosing ozone as an oxidant to the suspension while stirring the suspension;
step (d) filtering and separating the filtrate containing LiOH dissolved in water from a Li depleted residue of the black mass, preferably as solid or slurry.

Black mass, in the meaning of the present disclosure, is material from scrapped lithium-based batteries, in particular lithium-ion batteries, and/or scrapped parts thereof, and/or scrapped materials from Li-ion battery production processes, like active cathode materials, which were never fully incorporated into a battery. The above source materials are mechanically processed to a material, which is then called black mass, having a high surface to mass ratio. The typical black color of black mass may be attributed to carbon, in particular graphite or carbon black, which is often used in active anode materials of Li-ion batteries. But black mass is not limited to the presence of a sufficient fraction of carbon to color the black mass black as it is not essential that carbon black is present in black mass.

Black mass therefore typically contains several or all of the following elements: lithium (Li), carbon (C), cobalt (Co), nickel (Ni), manganese (Mn), iron (Fe), copper (Cu), aluminum (Al), phosphorus (P), fluorine (F).

Depending on the source material of the black mass, the fractions of the metals to be recovered in a recycling process may vary widely or could be even zero. Different battery chemistries, which are known for example as NMC, NCA, LFP, may lead to different fractions or the absence of valuable metals, e.g., Co, Ni or Mn. Thus, different constituents with other elements in various compositions are possible. But, black mass in the meaning of the present disclosure does contain the element Li when starting the process for recovery of metals. Nonetheless, the source of Li in the black mass may vary, for example, it can be chemically bound in active cathode material, and/or be metallic Li, in particular in/or around the active anode material.

Regarding step (b), it is further proposed that black mass is suspended in water with a mass in the range of 10 g to 300 g, preferably in the range of 10 g to 250 g, further preferably in the range of 180 g to 220 g, per 1 l water. For example, 200 g of black mass is suspended in 1 l water.

In step (c) of the above-disclosed process, ozone is dosed as an oxidant to the suspension while stirring the suspension. Preferably, ozone is dissolved in the water of the suspension. Thus, the black mass or at least fractions of the black mass is oxidized with ozone. Ozone ($O_3$) is known as a strong oxidant. Nonetheless, the application of ozone as an oxidant comes with several disadvantages as ozone is instable with regard to dioxygen and decomposes quickly. The half-life of ozone is further reduced when dissolved in water and even further reduced with increased temperatures, which results in very low efficiency of the process and can even prevent the ozone from reacting in the intended way when dissolved in water at elaborated temperatures. The solubility of ozone in water is very low.

It has been found that by stirring the suspension of black mass in water the mass transfer can be increased to an extent that allows the ozone to react with the black mass particles, in particular the surface of the black mass particles, in the suspension before the ozone decomposes. The effective use of ozone begins at high stirring rates and is even more effective with further increased stirring rates, so that very high oxidation potentials (>850 mV) can be generated.

Therefore, an aspect of the present disclosure further provides that intensive stirring or stirring at high stirring rates is applied to the suspension while dosing ozone as an oxidant to the suspension. Preferably, during step (c) there is an oxidation/reduction potential (ORP)>850 mV by dosing ozone to the suspension while stirring the suspension. The ORP can be further increased through stirring very intensively to >1200 mV during step (c). Ozone in this application is an order of magnitude cheaper than oxidants like persulphate used in alternative recovery processes. Ozone as a strong oxidant with ORP>850 mV oxidizes Co and Mn and does not rely upon them being already in the Co(III) and Mn (IV) state for recovery, allowing black masses with various mineralogies and pretreatment to be successfully processed.

It is further proposed that a turbulent flow is created within the suspension through stirring the suspension during step (c).

Preferably, said intensive stirring or stirring at high stirring rates is above a threshold, above which the fraction of ozone that is able to react with black mass is greater than the fraction of ozone that decomposes prematurely at the beginning of step (c).

In other words, according to the disclosed process, the suspension of water and black mass can be leached with ozone, in particular in a neutral leach, wherein a very high selectivity for Li can be reached.

Regarding step (d), the filtrate of the disclosed process enables the separation of LiOH (lithium hydroxide) dissolved in water from the rest of the material of the black mass, which can then be directed to further process steps.

The disclosed process has a very high selectivity for Li with very low fractions of other constituents other than LiOH dissolved in water. The leach is truly selective over Ni, Co and Mn to no detectable levels in advantageous embodiments, which are typically present in spent lithium-ion battery material and thus in black mass. The high selectivity for Li can be achieved over a wide variety of mineralogy of black masses and pretreatments. Furthermore, the disclosed process enables also high extraction rates of Li>90%. Therefore, the process is very efficient and is preferably a batch process, wherein recirculation is possible due to the high selectivity and is very advantageous as described further below. In particular, a contamination of the recovered lithium with alkali elements, in particular Na and/or K, can be avoided.

The entire hydrometallurgical removal of Li prevents carbon gas (COx) emissions that evolve when graphite, carbon black and/or organic components in the black mass are decomposed and volatiles at high temperatures.

The Li depleted residue of the black mass as solid and/or slurry has the Li extracted early in the process of the recovery. Thus, the extraction at the front end allows the independent processing with other processing options of the residue containing valuable elements, e.g., Ni, Co, Mn. Furthermore, lithium losses to other products and intermediates through low washing efficiency or co-precipitation are reduced.

Furthermore, the sodium (Na) requirement is very low due to the use of ozone.

According to a further development, an aspect of the present disclosure provides that:

in step (c) the suspension is stirred with a shear rate greater than 11000 $s^{-1}$, preferably greater than 25000 $s^{-1}$, further preferably greater than 27000 $s^{-1}$, further preferably greater than 29000 $s^{-1}$, for example 30000 $s^{-1}$ within the suspension. A high shear rate in particular above 11000 $s^{-1}$, for example 12000 $s^{-1}$, preferably above 29000 $s^{-1}$, increases the mass transfer to a sufficient extent, allowing ozone to react with the black mass before the ozone decomposes. With a shear rate above 11000 $s^{-1}$, for example 12000 $s^{-1}$, a sufficiently high ORP can be achieved to precipitate the suspension of water and black mass with ozone, wherein even higher shear rates can lead to an even higher ORP. For example, with a shear rate greater than 29000 $s^{-1}$ an ORP>850 mV can be achieved, while even higher shear rates may result in even higher ORP, for example >1200 mV.

For example, a shear rate in a fluid between two parallel plates can be determined by the relative velocity of the two plates divided by distance of the plates.

According to a further development, step (c) may be performed for at least 3 h, preferably at least 3.5 h, for example 4h.

The concentration of Li dissolved in the water of the suspension rises with time to the maximum extraction rate which can be reached within for example 4 hours. Adding to this, oxidation of Co and Mn is also dependent upon reaction duration, wherein a longer reaction duration allows a complete recovery from solution, for example after 3 h for Mn and after 4 hours for Co. Co- and Mo-oxides are thus precipitated after being dissolved in the solution. Therefore, performing step (c) for the duration above allows for a very high selectivity of the extraction process.

It is further provided that in step (c) ozone is dosed to the suspension with a rate of at least 0.1 gram($O_3$)/hour/gram (black mass), for example 1 gram($O_3$)/hour/gram(black mass), and/or with a maximum rate of 2 gram($O_3$)/hour/gram(black mass). Accordingly, the mass flow of ozone per hour is also dependent on the mass of the provided black mass containing lithium in the suspension. In order to provide ozone with an equal rate of, for example, 1.5 gram($O_3$)/hour/gram(black mass), the mass flow of ozone, for example, has to double when the provided black mass is doubled.

There is a lower limit of dosing ozone to the suspension in order to have a sufficient effect, while an upper limit is mainly due to economic reasons as the proposed stirring increases the effectiveness of the supplied ozone in a sufficient way.

According to a further development, in step (c) the temperature of the suspension is in the range from 70° C. to 95° C.

A temperature of 70° C. or more enables high Li extraction rates of more than 90%, which rate can be increased up to more than 95% at 90° C. Therefore, the suspension is preferably heated.

In an advantageous embodiment, in process step (c) the suspension of black mass in water has a pH value in the range of 6 to 8, preferably in the range of 7 to 8, for example a pH value of 8.

The extraction of Li in step (c) can be carried out in an advantageous embodiment in a neutral leach without any pH adjustment, disregarding the effect of the ozone, which simplifies the process and is thus cost effective. In this case the utilization of sodium in the Li recovery process can be reduced even further, preferably to zero. Dosing ozone as an oxidant to the suspension while stirring the suspension, the suspension preferably has a pH value in the range of 6 to 8, in particular in range of 7 to 8, which allows for extraction rates of approximately above 70% for Li. Furthermore, the proposed pH range, in particular a pH value of 7 to 8, has the beneficial effect that Co, Mn and especially Ni is precipitated from solution, respectively is not dissolved into the solution, leading to a very high selectivity of Li extraction as LiOH in water from black mass while still having good extraction rates for Li.

Accordingly, the filtrate of step (d) containing the Li may have also a pH value in the range of 6 to 8, in particular 7 to 8, enabling a cost-effective further processing of the filtrate.

In a further development, it is proposed that an acid, preferably sulfuric acid ($H_2SO_4$), is added to the suspension in step (b) and/or in step (c) and the pH value of the suspension is dropped to a pH value in the range of 3.5 to 4.5.

A pH value lower than 4.5 increases the extraction rate of Li even further compared to embodiment of the process without said dropping the pH value, which results in Li extraction rates above 90%, wherein an extraction rate for Li even above 95% is possible. A pH value below 3.5 results in an excessive loss of Li selectivity.

While Co and Mn can be completely recovered by the proposed reaction duration above, for example 4h, dropping the pH value in the range of 3.5 to 4.5 has the side effect that Ni extraction increases with a longer duration along with Li extraction. Thus, the extraction rate for Li is increased to a very high value, but Ni is also dissolved.

The acid is preferably sulfuric acid ($H_2SO_4$), which can be have further beneficial effect downstream the recovery process of metals, for example for crystallization of Ni-sulfate. Nonetheless, other acids may be suitable dependent on the desired end products of the process for recovery of metals.

It is further provided that after step (c) a caustic, preferably sodium hydroxide (NaOH) and/or calcium hydroxide ($Ca(OH)_2$) and/or calcium oxide (CaO), is added and the pH value of the suspension is raised before step (d) or the pH value of the filtrate of step (d) is raised to a pH value higher than 6, preferably to a pH value higher than 9, further preferably to a pH value higher than 10.

In particular a pH value of higher than 9, for example 10, preferably a pH value higher than 10, allows to fully precipitate the Ni(II) as a hydroxide from the Li-bearing leachate. This is especially advantageous when the pH value of the suspension was dropped below or equal to 6 or in particular when dropped below or equal to 4.5 with an acid in order to maximize the Li extraction rate. Thus, the side effect of dissolved Ni can be reversed, leading to high very high extraction rate of Li dissolved in water above 90%, for example 95%, while having a very high selectivity or purity of the dissolved Li.

Raising the pH value of the suspension or filtrate with a caustic is preferably done at a temperature of 25° C. to 70° C.

Preferably the pH value is adjusted to pH>9, for example pH=10, further preferably to pH>10 before filtering the suspension.

Accordingly, the filtrate contains Li dissolved as LiOH in water with a very high purity. Other elements which can be present in the black mass like Ni, Co, Mn, Cu, Al, Fe remain in the residue.

Moreover, said pH adjustment with Ca-containing caustics, in particular calcium hydroxide and/or calcium oxide, removes F and/or P from the solution so that a lower content of F and P in the filtrate is achieved.

Said pH adjustment with Na-containing caustics, in particular sodium hydroxide, leaves F and P in the solution, allowing separation of F from the residue and the further processing of the residue, which can advantageously prevent HF build up in other processes downstream, e.g., in black acid. The necessary amount of Na added to adjust the pH value to the values described above is significantly lower than the solubility limit, and does not result in Na contamination of the Li product.

As a result, the filtrate containing LiOH dissolved in water having high purity created by the disclosed process and the Li depleted residue, respectively the residue with greatly reduced Li content, can be processed independently to the desired form of the end product of the recovered metals from the black mass. Therein, it is possible to take advantage of the high selectivity and extraction rate of Li of the proposed process.

According to a further development, it is disclosed to evaporate at least 20 vol % of the filtrate containing LiOH dissolved in water.

Increasing the evaporation extent increases Li recovery extent in following Li recovery steps. This is due to high solubility of Li-salts, which prevent complete precipitation, and increased precipitation kinetics and precipitation efficiency resulting from higher starting Li concentration. The temperature of evaporation is >60° C. if vacuum is used. The temperature is >100° C. when atmospheric pressure or higher pressure is used.

According to a further development, it is disclosed to precipitate lithium hydroxide (LiOH) from the filtrate containing LiOH dissolved in water, preferably by means of evaporation and/or crystallization. Accordingly, lithium hydroxide (LiOH) is preferably extracted by means of evaporation and/or crystallization from the filtrate containing LiOH dissolved in water. Preferably, the lithium hydroxide (LiOH) can be extracted without any further additives.

According to a further development, one of the following additives may be added to the filtrate containing LiOH dissolved in water:
    phosphate source, preferably phosphoric acid ($H_3PO_4$) and/or sodium phosphate ($Na_3PO_4$), and to precipitate lithium phosphate ($Li_3PO_4$); and/or carbonate source, preferably carbonic acid ($H_2CO_3$) and/or carbon dioxide ($CO_2$) and/or sodium carbonate ($Na_2CO_3$), and to precipitate lithium carbonate ($Li_2CO_3$)).

The filtrate containing LiOH dissolved in water is preferably the filtrate of step (d), but may also be the filtrate of further filtering steps. As the additive is added to said filtrate in order to precipitate Li or Li-salts, the filtrate becomes a suspension accordingly.

Depending on the desired lithium salt, the appropriate additive can be chosen as proposed above, so that the recovery process is very flexible with regard to the Li-bearing end product. Lithium phosphate is for example suitable for Li-ion batteries of the LFP type, wherein lithium phosphate is in particular advantageous due to its lower solubility limit compared to lithium carbonate, allowing better recovery rates.

A temperature of 50° C. to 95° C. can be used for the precipitation. In the case of lithium phosphate, the solubility increases at higher temperature, however the precipitation efficiency increases as well. A lower temperature in the range of 50° C. to 60° C. requires less energy and is advantageous if cooling from an evaporation step is not required.

According to a further development, a caustic, preferably sodium hydroxide (NaOH) and/or calcium hydroxide ($Ca(OH)_2$), is added to the filtrate containing LiOH dissolved in water. Preferably the pH value is thereby increased or maintained equal to or greater than 9, further preferably equal to 10, even more preferably greater than 10.

Adding said caustic can be used to stabilized the pH value when acids are added to the filtrate containing LiOH dissolved in water in order to precipitate Li. Further on, the caustic can be added to increase the pH value to pH>9, for example pH 10, which decreases solubility of Li, in particular lithium phosphate ($Li_3PO_4$), with increasing pH value up to pH 10. Thus, higher recovery rates are possible when precipitating Li. Said caustics can be added in order to counteract the effect on the pH value of the added acid to precipitate Li, thus maintaining the pH value above 9.

The precipitated Li salts are preferably filtered out and the Li-salts in the residue are then processed to end products.

According to a further development, the precipitated lithium phosphate ($Li_3PO_4$) and/or lithium carbonate ($Li_2CO_3$) and/or lithium hydroxide (LiOH) may be filtered out and the filtrate may be recirculated back to the suspension of black mass and water in step (b) and/or (c).

The recirculation prevents Li losses to a waste water stream. This in particular advantageous for lithium carbonate ($Li_2CO_3$) and/or lithium hydroxide (LiOH), which have higher solubility limits than lithium phosphate ($Li_3PO_4$). Since the loss due to solubility is minimized by recirculation, the product selection can be independent of solubility limit. Higher recovery rates are possible due to the recirculation, so that the lower recovery rates of lithium carbonate and lithium hydroxide are compensated and overall a higher recovery rate of Li is achievable. Therefore, the selection of the desired lithium end product can be made more freely, so that the directly refinable Li-salts lithium carbonate and lithium hydroxide could be selected over lithium phosphate in a reasonable manner.

The recirculation of the filtrate back to the suspension of black mass and water in step (b) and/or (c) is in particular beneficial in combination with maintained higher pH values in the forgoing process step, preferably above pH 4.5, further preferably above pH 6, even further preferably above pH 7, for example pH 8. Thus, the pH value is preferably not dropped by addition of an additional acid prior to Li precipitation. The lower Li extraction rate for said higher pH in step (c) can be compensated by the recirculation of the filtrate from Li precipitation back to the suspension due to the high Li selectivity of the proposed process comprising ozone and stirring. Thus, there is less need for sodium and acid to recover Li from black mass or spent battery materials which reduces the environmental impact in treating process waste water even further.

According to a further development, the recirculated filtrate is bled periodically.

Said bleeding is in particular useful to bleed Na and F. The use of sodium hydroxide (NaOH) as a Na-bearing caustic added to the Li-bearing filtrate as described above results in higher concentrations of Na recirculating in solution, which can be periodically bled to prevent possible $Na_2SO_4$ crystallization, which could result in lower overall Li recovery.

The use of calcium hydroxide as Ca-bearing caustic may result in the deportment of Ca, F and P to further processing steps of the Li depleted residue of step (d).

The high Li extraction rate at the front-end of the proposed process for recovery of metals enables different processes downstream, which could be otherwise inefficient or impossible.

According to a further development, the Li depleted residue of step (d) is leached in an acidic leach step (e), wherein at least one acid, preferably sulfuric acid ($H_2SO_4$), and/or recirculated acid, in particular recirculated black acid, is added and the pH value is dropped below pH 3.

Preferably, a reductant, preferably sulfur dioxide ($SO_2$), is added to the acidic leach step (e).

According to a further development, a calcium source, preferably calcium hydroxide ($Ca(OH)_2$) and/or calcium oxide (CaO) and/or calcium carbonate ($CaCO_3$), is added to the leachate and/or suspension of step (e) and to filter the suspension in a step (f).

According to a further development, ozone is dosed as an oxidant to the filtrate of step (f) while stirring in a step (g), to maintain a pH value in the range of 2 to 4, preferably a pH value of 3, and to filter the resulting suspension.

Recovery extents of >95% for Co, >99% for Mn and <3% for Ni are achievable with the proposed process. As a result of the filtering in step (g) Co- and/or Mn are recovered in the residue, wherein Ni is extracted in the filtrate of step (g).

According to a further development, in a step (h), sulfuric acid ($H_2SO_4$) is added to the filtrate of step (g) and the sulfuric acid ($H_2SO_4$) concentration is raised to at least 500 g/l to crystallize Ni-sulfate.

The crystallized Ni-sulfate is preferably separated by filtering. The filtrated solution or filtrate is referred as black acid.

Preferably, the above filtered solution known as black acid from step (h) is recirculated to the acidic leach step (e).

A facility for executing a process is also disclosed.

In a first preferred embodiment of the process for recovery of metals, the process steps of separating a filtrate containing LiOH dissolved in water from a Li depleted residue of the black mass is described in the following example.

Black mass is provided in a step (a) as the metals, especially Li, containing source material. The black mass is made from Li-ion battery scrap which was transformed to a powder. The mineralogy of the black mass may vary depending on the starting materials, respectively scrap materials. As an example, the two mineralogies of black mass are as follows:

Black mass #1: $C_1$; $Co_{0.2069}$ $Li_{0.756}$ $Ni_{0.793}$ $O_2$; $Ni_1O_1$; $Al_2O_3$;

Black mass #2: C1; Fe1Ni3; Mn1O1; Cu0.8Fe0.2; C0.5H8.9 Fe3 O8.95; Al1 Li1O2; Cu1 O1;

A black mass used in this example may have a composition of the elements according to Table 1:

TABLE 1

| element | Li | Ni | Co | Mn | F | P |
|---|---|---|---|---|---|---|
| black mass [wt %] | 4.3 | 13.5 | 14.6 | 9.9 | 2.3 | 0.37 |

The rest may comprise for example elements such as C, H, O, Fe, Al, Cu.

The black mass is suspended in water in a step (b), wherein 50 g of black mass with the composition in Table 1 is suspended in 1 l water.

The suspension is heated to 70° C. and ozone ($O_3$) is dosed to the suspension at 0.9 l/min, which suspension is stirred while dosing ozone in a step (c). The suspension is stirred intensively, creating a shear rate in the suspension of approximately 29000 s$^{-1}$. The pH value settles to pH 8. The reaction at 70° C. is stopped after 4 hours.

Figure 1:
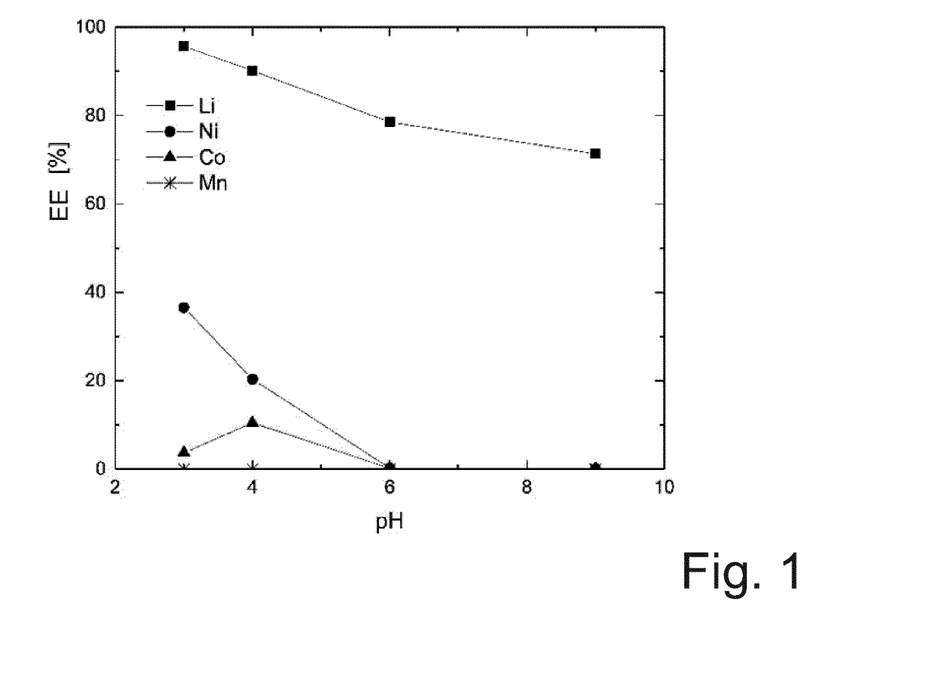
FIG. 1 shows the extraction extent EE in % of Li, Ni, Co and Mn over the pH value.

In a following step (d), the suspension is filtered, wherein the filtrate contains about 70% of the lithium of the initial black mass, which lithium is dissolved in water. Accordingly, the residue contains about 30% of the lithium of the initial black mass, wherein the residue further contains essentially all of the Ni, Co, Mn, so that a high purity of Li in the solution is available for further processing of the solution. This is also illustrated in FIG. 1, which shows the extraction extent EE of Li, Ni, Co and Mn in dependence of the pH value. Therein, the high selectivity for Li of the leaching process with ozone at elevated temperatures of the suspension of black mass in water is shown for pH values greater than 6, wherein stirring the suspension with very high shear rates while suppling ozone to the suspension is essential to achieve the intended oxidation of the black mass with ozone.

In a second preferred embodiment of the process for recovery of metals, the process steps of separating a filtrate containing LiOH dissolved in water from a Li depleted residue of the black mass is described in the following example.

Deviating from the first embodiment, an acid is added to the suspension of black mass and water, after the beginning of step (c), namely dosing ozone to the suspension while stirring the suspension. In this preferred embodiment 50% sulfuric acid ($H_2SO_4$) is added to drop the pH value to 4. The reaction is then continued for 4 hours.

Figure 2:
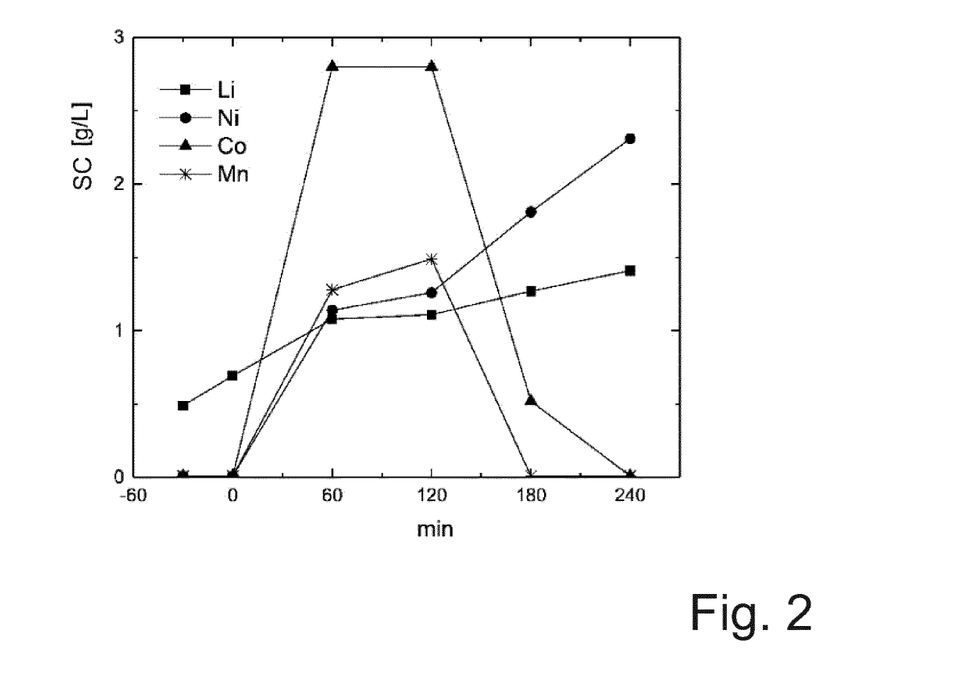
FIG. 2 shows the solution concentration SC in g/l of Li, Ni, Co and Mn over time in min.

FIG. 2 shows the solution concentration SC in g/l of Li, Ni, Co and Mn over time in min and that the extent of Co and Mn oxidation is dependent on the reaction duration. Co and Mn are oxidized to Co(III)- and Mn(IV)-oxides, thus a longer duration allows Co and Mn to be completely recovered from the solution. The Li and Ni extraction increases with a longer duration at the above pH value.

Hence, the extraction rate for Li can be increased to over 90% compared to appr. 70% of the first embodiment where no additional acid is supplied to the suspension. This is also in accordance with the data of FIG. 1. Therefore, in the second embodiment a higher extraction rate for Li is achieved while giving up some selectivity of the process, wherein Ni is partially extracted as Ni(II).

Figure 3:
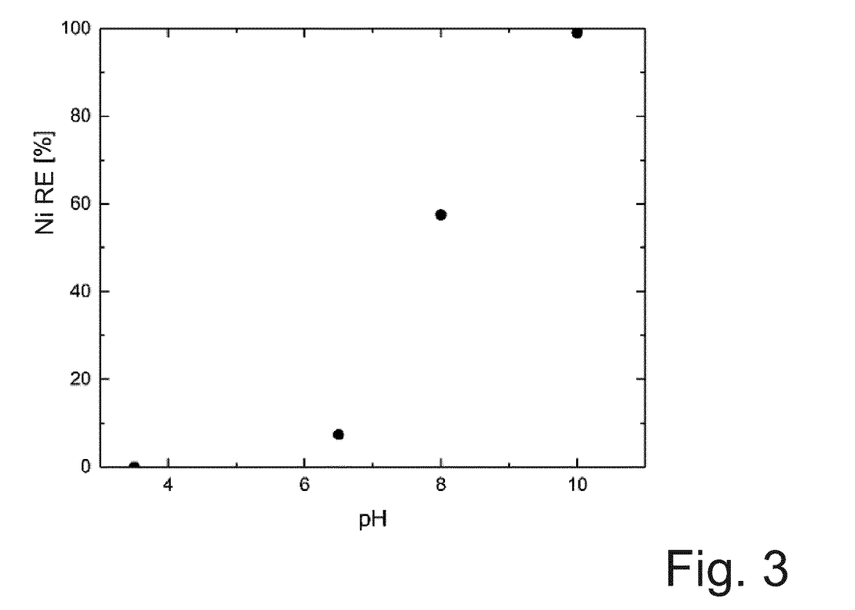
FIG. 3 shows the recovery extent Ni RE in % of Ni over the pH value.

After the above reaction, respectively process step (c), in this advantageous embodiment a 12 ml suspension of calcium oxide (CaO) is added to 500 ml of the above suspension at 50° C., increasing the pH value to 10. The reaction is finished after 1.5 h. Ni in the solution is precipitated, wherein the extent of the precipitation Ni RE over the pH value is shown in FIG. 3. Accordingly, increasing the pH value to pH 10 results in a complete recovery of the dissolved Ni.

Also other caustics like sodium hydroxide (NaOH) and/or calcium hydroxide (Ca(OH)$_2$) can be used. Typical solution concentration after the pH adjustment to pH 10 is shown in Table 2 for different caustics.

TABLE 2

| caustic | Li | Ni | Co | Mn | Cu | Al | Fe | F | P | Ca | Na |
|---|---|---|---|---|---|---|---|---|---|---|---|
| Ca-based [g/l] | 1.63 | 0.00 | 0.00 | 0.00 | 0.00 | 0.00 | 0.00 | 0.24 | 0.00 | 0.30 | 0.00 |
| Na-based [g/l] | 1.51 | 0.00 | 0.00 | 0.00 | 0.00 | 0.00 | 0.00 | 0.39 | 0.047 | 0.00 | 0.99 |

Alike the first embodiment, in a following step (d), the suspension is filtered, wherein the filtrate of the second embodiment contains over 90% of the lithium of the initial black mass, which lithium is dissolved in water. Thus, the residue is even more Li depleted and contains less than 10% of the lithium of the initial black mass.

As shown in Table 2, the process has a very high extraction rate and high selectivity of Li, while the process is very cost-effective.

In a third preferred embodiment, the further processing for recovery of lithium from the filtrate containing LiOH dissolved in water of the first or second embodiment or any embodiment according to a process according to the invention is described.

The filtrate containing LiOH dissolved in water is evaporated to concentrate the lithium, wherein the extent of evaporation is >20 vol %. Increasing the evaporation extent increases the Li recovery extent in the following Li recovery process.

For example, the process following the second embodiment may be as follows. The Li-bearing solution, for example 300 ml, is heated to 95° C., wherein the pH is 10. The starting solution concentrations are shown in Table 3.

TABLE 3

| [g/l] | Li | Ni | Co | Mn | F | P | Na |
|---|---|---|---|---|---|---|---|
| starting solution | 1.68 | 0.00 | 0.00 | 0.00 | 0.41 | 0.071 | 1.093 |

Figure 4:
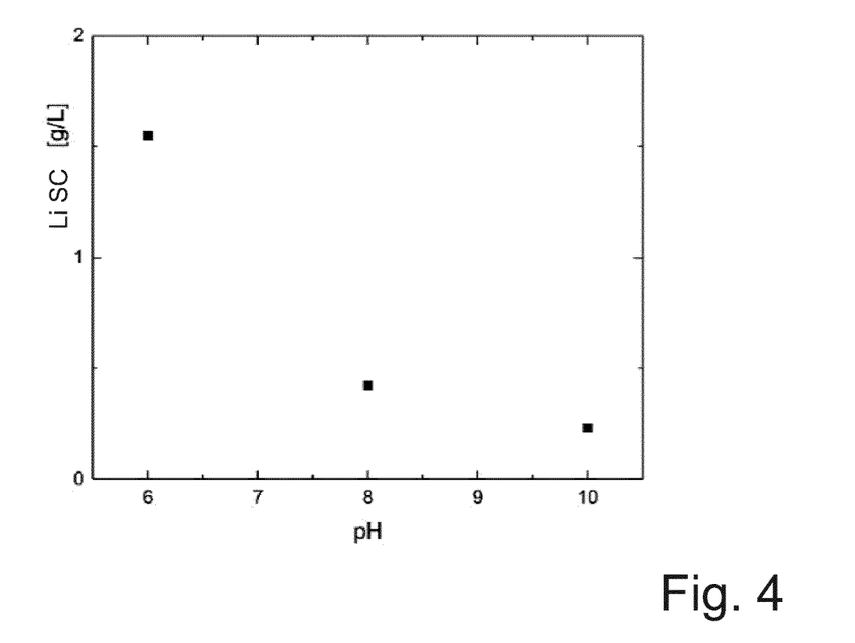
FIG. 4 shows the lithium solution concentration Li SC in g/l after lithium phosphate precipitation over the pH value.

Phosphoric acid $H_3PO_4$ is added to form $Li_3PO_4$, wherein NaOH and/or in an alternative embodiment Ca(OH)$_2$ is added to maintain pH of >10. Maintaining a pH>10 increases Li recovery as the $Li_3PO_4$ solubility in solution decreases with increasing pH up to pH 10. The Li remaining in solution Li SC following Li recovery due to Li-phosphate solubility is shown in FIG. 4.

A temperature of 50° C. to 95° C. can be used for the precipitation. $Li_3PO_4$ solubility increases at higher temperature, however the precipitation efficiency increases as well. A lower temperature around 50° C. requires less energy and is preferred if cooling from the evaporation step is not required.

In the example above 1.29 ml 85% $H_3PO_4$ is added to the solution. The pH is kept at 10 by adding 55.5 ml 1 M NaOH. The reaction at 95° C. is ended after 1 h. The filtrate concentration is shown in Table 4. The Li-precipitate composition has 19.57 wt % Li.

The Li-bearing filtrate following Li recovery is recirculated to the suspension of black mass and water of step (b) and/or the leach, in particular the neutral leach of step (c) as make-up solution. Recirculation prevents Li losses to a waste stream. A periodic bleed of the filtrate is used when Na-based caustics are used, wherein the bleed is to limit Na and F. The recirculation of Li recovery filtrate is possible due to low impurities in the filtrate, wherein a filtrate analysis is shown in Table 4.

TABLE 4

| [g/l] | Li | Ni | Co | Mn | F | P | Na |
|---|---|---|---|---|---|---|---|
| filtrate for recirculation | 0.223 | 0.00 | 0.00 | 0.00 | 0.12 | 0.13 | 4.867 |

The recirculation is especially beneficial in combination with the first embodiment, where the pH value is not dropped with means of an added acid, so that less caustics are necessary to raise the pH value of the solution to precipitate Ni again and to achieve high pH values in order to increase the Li recovery. Further on, even lower pH values could be used, see FIG. 4, as Li remaining in solution Li SC at lower pH values than 10 is not lost to a waste stream.

The recovery of the remaining elements from the Li depleted black mass or residue, including e.g., Ni, Co, and/or Mn, is described in the following advantageous embodiment.

In a first step the residue from the first or second embodiment or a residue according to the proposed process in general is leached with sulfuric acid ($H_2SO_4$) and $SO_2$ (gaseous) in an acidic leaching step. The temperature is 70° C. and ORP<200 mV. The pH is controlled to <2 by recirculated acid or black acid, see process step (h), and/or sulfuric acid addition. All remaining metals are leached from the black mass. The graphite stays in the residue. The suspension is preferably not filtered following the leach.

In a second step fluorine (F) is precipitated from the acidic leaching step by adding a Ca-source, for example calcium hydroxide ($Ca(OH)_2$), calcium oxide (CaO) and/or calcium carbonate ($CaCO_3$). The HF and F-ion are precipitated with Ca as $CaF_2$. The suspension is filtered following precipitation.

In a third step Co and Mn are recovered. Therefore, ozone ($O_3$) is dosed to the F-precipitation filtrate. The pH is controlled to pH 3 by adding calcium hydroxide ($Ca(OH)_2$). The Co and Mn precipitate out of solution. Recovery extents are >95% Co, >99% Mn, <3% Ni.

In a fourth step of the recovery of the remaining elements from the Li depleted black mass or residue, sulfuric acid ($H_2SO_4$) and recirculated acid, respectively black acid, are added to the Co, Mn recovery filtrate to concentrations 150-400 g/L $H_2SO_4$. The temperature of evaporation is >100° C. The evaporation extent is to reach an $H_2SO_4$ concentration of 800 g/L. Ni, Cu and Al crystallize out of solution and are recovered. The filtered solution is referred to as black acid, and is preferably recirculated to the acidic leach step.

In general, the disclosed process for recovery of metals from black mass is possible with hydrometallurgical processes.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A process for recovery of metals from a black mass, the process comprising the following steps in the following order:
   step (a) providing the black mass, which comprises Li;
   step (b) adding water to the black mass and creating a suspension of the black mass in the water;
   step (c) dosing ozone as an oxidant to the suspension while stirring the suspension; and
   step (d) filtering and separating a filtrate containing LiOH dissolved in water from a Li depleted residue of the black mass
   wherein in step (c), the suspension is stirred with a shear rate greater than 11,000 s-1 within the suspension,
   wherein the process further comprises, in a step (e), leaching the Li depleted residue of step (d) in an acidic leach, wherein at least one acid is added and the pH value is dropped below pH 3,
   wherein the process further comprises:
   adding a calcium source to the leachate or the suspension of step (e); and
   in a step (f), filtering the suspension, and
   wherein the process further comprises,
   in a step (g), dosing ozone as an oxidant to the filtrate of step (f) while stirring, maintaining a pH value in the range of 2 to 4, and filtering the resulting suspension.

2. The process according to claim 1, wherein:
   in step (c), the suspension is stirred with the shear rate greater than 25,000 s-1 within the suspension.

3. The process according to claim 1, wherein:
step (c) is performed for at least three hours.

4. The process according to claim 1, wherein:
in step (c), ozone is dosed to the suspension with a rate of at least 0.1 gram ($O_3$)/hour/gram (black mass) or with a maximum rate of 2 gram ($O_3$)/hour/gram (black mass).

5. The process according to claim 1, wherein:
in step (c), the temperature of the suspension is in the range from 70° C. to 95° C.

6. The process according to claim 1, wherein:
in step (c), the suspension of the black mass in the water has a pH value in the range between 6 to 8.

7. The process according to claim 1, the process further comprising:
adding an acid to the suspension in step (b) or step (c); and
dropping the pH value of the suspension to a pH value in the range between 3.5 and 4.5.

8. The process according to claim 7, the process further comprising:
after step (c), adding a caustic; and
raising the pH value of the suspension before step (d) or raising the pH value of the filtrate of step (d) to a pH value higher than 6.

9. The process according to claim 1, the process further comprising:
evaporating at least 20 vol % of the filtrate containing LiOH dissolved in water.

10. The process according to claim 1, comprising:
precipitating lithium hydroxide (LiOH) from the filtrate containing LiOH dissolved in water by evaporation or crystallization.

11. The process according to claim 1, the process further comprising:
adding one of the following additives to the filtrate containing LiOH dissolved in water:
a phosphate source and precipitating lithium phosphate ($Li_3PO_4$); or
a carbonate source and precipitating lithium carbonate ($Li_2CO_3$).

12. The process according to claim 10, the process further comprising:
adding a caustic to the filtrate containing LiOH dissolved in water.

13. The process according to claim 10, the process further comprising:
filtering the precipitated lithium hydroxide (LiOH) out; and
recirculating the filtrate back to the suspension of the black mass and the water in step (b) or (c).

14. The process according to claim 13, the process further comprising:
bleeding the recirculated filtrate periodically.

15. The process according to claim 1, the process further comprising:
adding a reductant to the acidic leach step (e).

16. The process according to claim 1, the process further comprising:
in a step (h), adding sulfuric acid ($H_2SO_4$) to the filtrate of step (g); and
raising the sulfuric acid ($H_2SO_4$) concentration to at least 500 g/L to crystallize Ni-sulfate.

17. The process according to claim 11, the process further comprising:
filtering the precipitated lithium phosphate ($Li_3PO_4$) or lithium carbonate ($Li_2CO_3$) out; and
recirculating the filtrate back to the suspension of the black mass and the water in step (b) or (c).

* * * * *